United States Patent
Takeda et al.

(10) Patent No.: US 6,624,594 B2
(45) Date of Patent: Sep. 23, 2003

(54) DISCHARGE LAMP LIGHTING CIRCUIT

(75) Inventors: Hitoshi Takeda, Shizuoka (JP);
Akihiro Mochizuki, Shizuoka (JP);
Masayasu Ito, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/071,203

(22) Filed: Feb. 11, 2002

(65) Prior Publication Data
US 2002/0109468 A1 Aug. 15, 2002

(30) Foreign Application Priority Data
Feb. 14, 2001 (JP) ...................... P2001-036959

(51) Int. Cl.[7] ........................... H05B 41/16; H05B 37/02
(52) U.S. Cl. ....................... 315/219; 315/308
(58) Field of Search ................... 315/219, 224, 315/308, 310, 209 R, DIG. 5, DIG. 7

(56) References Cited

U.S. PATENT DOCUMENTS

| 6,034,490 A | * | 3/2000 | Yamashita et al. | ........... 315/310 |
| 6,100,644 A | * | 8/2000 | Titus | ............... 315/209 R |
| 6,294,879 B1 | * | 9/2001 | Nagase et al. | .......... 315/209 R |
| 6,392,364 B1 | * | 5/2002 | Yamamoto et al. | ......... 315/291 |
| 6,486,614 B1 | * | 11/2002 | Nakano | ...................... 315/289 |

FOREIGN PATENT DOCUMENTS

| JP | 2001-6888 | 1/2001 |
| JP | 2001-6890 | 1/2001 |
| JP | 2001-203086 | 7/2001 |
| JP | 2001-203087 | 7/2001 |

* cited by examiner

*Primary Examiner*—Don Wong
*Assistant Examiner*—Minh D A
(74) *Attorney, Agent, or Firm*—Sughrue Mion, PLLC (57) ABSTRACT

A capacitor C1 and a switch element SG are provided in the primary side of a transformer TT in a start-up circuit 5. Charge stored in the capacitor C1 is discharged when the switch element SG is turned on. A capacitor C2 and a rectifying element D2 are inserted between the output of a DC-AC converting circuit 4 and ground. The capacitor C2 is charged by a current flowing in the forward direction of a rectifying element D2. A capacitor C3 and a rectifying element D3 are inserted between a node between the secondary winding T2 of a transformer T and a rectifying element D1, which form a DC-DC converting circuit 3, and a node on a line connecting the second capacitor C2 and the rectifying element D2. The capacitor C3 is charged by a current flowing in the direction as defined by the third rectifying element D3. A node between the capacitor C3 and the rectifying element D3 is connected to a voltage supplying line to the capacitor C1 of the start-up circuit 5, whereby its charge is stored.

5 Claims, 12 Drawing Sheets

DISCHARGE LAMP LIGHTING CIRCUIT

BACKGROUND OF THE INVENTION

1. Field of the Invention

The present invention relates to a technique for reducing the size of a discharge lamp lighting circuit and the cost to manufacture the same, and for equalizing time intervals at which high tension pulses are generated.

2. Description of the Related Art

There is known a lighting circuit for lighting up a discharge lamp (e.g., metal halide lamp), which is made up of a DC power source circuit, a DC-AC converting circuit, and a start-up circuit (called a starter circuit). In its application to a light source of a vehicular lighting device, for example, a DC-DC converting circuit (DC-DC converter) is used for the DC power source circuit. A full bridge circuit (=a circuit consisting of four semiconductor switching elements which are on/off controlled in the form of two pairs of switching elements) and its drive circuit are used for a DC-AC converting circuit. The output voltage of the DC-DC convertor is converted into a voltage of a rectangular waveform in the full bridge circuit, and the converted one is applied to the discharge lamp.

To start up the discharge lamp, to generate high voltage necessary for breaking down the discharge lamp, a switching element, e.g., a spark gap element, and a capacitor for storing charge are provided in the primary side circuit including the primary winding of a transformer (starter transformer). Energy produced when the switching element is rendered conductive and the capacitor is discharged generates a start-up pulse, and the pulse is supplied to the discharge lamp.

The following circuits may be enumerated for the circuit for charging the capacitor.

1) A dedicated high tension winding is connected to a transformer of the DC-DC converting circuit, and an output voltage derived from the winding is used for charging the capacitor.

2) A switching power source is used for the DC-DC converting circuit. A supply voltage necessary for charging the capacitor is produced by utilizing the switching operation based on its output control.

3) A supply voltage necessary for charging the capacitor is produced by utilizing the switching operation based on the output control of the DC-AC converting circuit.

In the charging circuit of 1) above, a dedicated winding is provided at the secondary winding of the transformer. The output voltage of the winding is rectified and smoothed, and the resultant voltage is used. In the circuit 2) or 3) above, a charge transfer circuit, a charge pump circuit or the like, which is made up of a plurality of capacitors and resistors, is disposed in the output stage of the DC-DC converting circuit or the DC-AC converting circuit. A voltage necessary for charging the capacitor of the start-up circuit is produced by such a circuit arrangement.

However, the related charging circuits have the following problems.

In the case of the above 1), an electrical load is applied to the transformer of the DC-DC converting circuit. Additional use of the high tension winding brings about size increase of the transformer. A necessity of using a breakdown withstanding structure arises in order to prevent the corona discharge from occurring. When the covered cord of the multi-layered type is used for the high tension winding, instead of employing the breakdown withstanding structure, cost-increase problem arises anew.

As to the circuit of the above 2), it suffers from the following problems. The number of electronic parts used is increased. High breakdown withstanding parts must be used. The conduction intervals at which the switching element of the start-up circuit is made conductive are instable.

Figure 17:
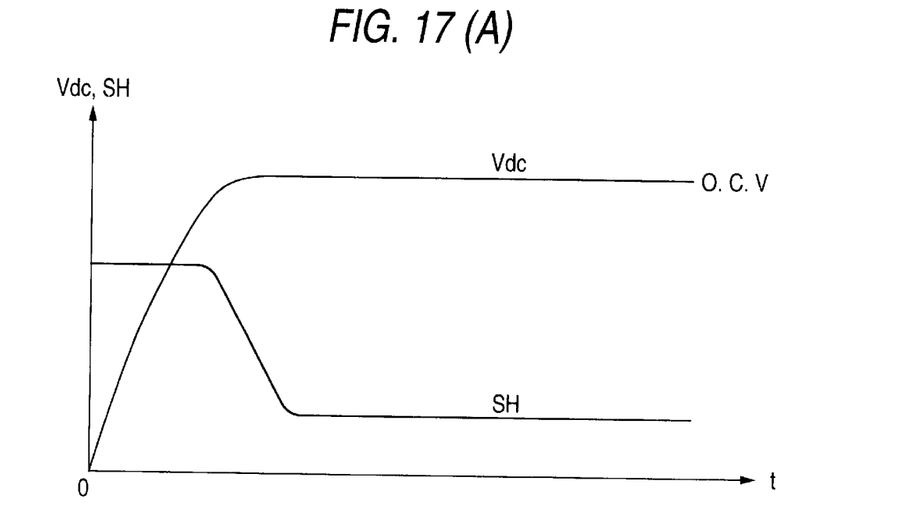
FIGS. 17(A) and 17(B) show the graphs for explaining the problem of the related art.

FIG. 17 is presented for explaining the problems of the related art. An upper graph in the figure roughly shows a variation of the output voltage "Vdc" of the DC-DC converting circuit and a switching frequency SH (=a frequency at which the switching element of the DC-DC converting circuit is turned on and off) with respective to time. In either case, a start point of time "t" is a lighting start time point (=time point of turning on the lighting switch).

As shown, the output voltage "Vdc" swiftly rises, and reaches a voltage ("O.C.V."=open circuit voltage) and depicts a flat curve. The switching frequency SH is continuously high till the output voltage "Vdc" reaches the O.C.V. (viz., the switching element is frequently turned on and off). Subsequently, the load is light and hence the switching frequency is low, viz., the switching element is intermittently turned on and off. Where the switching frequency (=number of switching times) is low, the amount of charge supplied to the capacitor in the start-up circuit is lessened. As a result, a time taken for the switching element (spark gap element or the like) in the start-up circuit to be conductive is long.

A lower graph in FIG. 17 shows its sate, and a variation of the voltage "VC" across the capacitor in the start-up circuit with respective to time. In the figure, a time point where the voltage "VC" rises and rapidly decreases indicates a time point where the switching element starts its conduction. A start point of time "t" is a lighting start time point.

As seen from the figure, when the switching frequency SH is high, the voltage "VC" rapidly rises, while when the switching frequency SH is low, the voltage "VC" gently rises. Accordingly, with regard to the time intervals at which the high tension pulses (or the start-up pulse) are generated by the start-up circuit, a first start-up pulse is short in width and quickly generated. A second start-up pulse and the subsequent ones are wide and generated at slow generation timings.

The circuit of 3) above needs a capacitor of large capacity, and hence has the problem of cost and size reduction. This is due to the fact that the switching frequency in the DC-AC converting circuit is much lower than that in DC-DC converting circuit. In this sense, the problem may be solved by increasing the switching frequency. Where it is high, the problem of the acoustic resonance phenomenon of the discharge lamp arises anew, however. Therefore, there is a limit in increasing the switching frequency (generally, several hundreds Hz).

Thus, the related techniques are incapable of satisfactorily meeting the requirements of the circuit size and cost reduction. The techniques have still some problems in generating the start-up pulse at fixed time intervals.

SUMMARY OF THE INVENTION

Accordingly, an object of the present invention is to provide a discharge lamp lighting circuit which is suitable for the circuit size and cost by simplifying a circuit for producing a supply voltage necessary for generating a start-up pulse to be applied to a discharge lamp, and to generate start-up pulses at fixed time intervals.

To achieve the above object, there is provided a discharge lamp lighting circuit having a DC-DC converting circuit, a DC-AC converting circuit provided at the post stage of the DC-DC converting circuit, and a start-up circuit for generating a start-up pulse for application to a discharge lamp. The discharge lamp lighting circuit is characteristically constructed as follows.

In the discharge lamp lighting circuit, the start-up circuit includes a transformer, a primary side circuit having the primary winding of the transformer includes a first capacitor and a switch element, when the switch element is conductive, charge stored in the first capacitor is discharged, and a high voltage pulse generated in the secondary winding of the transformer is supplied as a start-up pulse to the discharge lamp.

The DC-DC converting circuit includes a transformer and a switch element for the output control, a first rectifying element and a smoothing capacitor are provided at the output stage of the transformer, and energy stored in the transformer is stored into the smoothing capacitor through the first rectifying element by an on/off control of the switching element.

The DC-AC converting circuit includes a bridge circuit using a plurality of switching elements, and the output signal of the DC-DC converting circuit is output, in the form of an alternate current varying at a fixed or variable frequency, through alternating operations of the switching elements by the on/off control.

A circuit includes a second capacitor and a second rectifying element between one of the output terminals of the DC-AC converting circuit and a ground line or a line equivalent to it, and the second capacitor is charged with current flowing in the direction as defined by the second rectifying element connected to the line.

A circuit includes a third capacitor and a third rectifying element is disposed between a node between the secondary winding of the transformer in B) above and the first rectifying element and a node on a line connecting the second capacitor and the second rectifying element, and the third capacitor is charged with current flowing in the direction as defined by the third rectifying element connected to a connection line connecting the second capacitor and the second rectifying element.

A node between the third capacitor and the third rectifying element is connected to a voltage supply line to the first capacitor in A) above to charge the capacitor.

According to the present invention, the discharge lamp lighting circuit charges the second and third capacitors by the utilization of the switching controls of the DC-DC converting circuit and DC-AC converting circuit, whereby, the supply voltage necessary for charging the first capacitor in the start-up circuit is obtained. Accordingly, the number of parts used is relatively small and use of a capacitor of small capacitance is allowed. It is noted that the switching control of the DC-AC converting circuit as well as that of the DC-DC converting circuit is utilized. Therefore, the time intervals at which the start-up pulses are generated are substantially equal and hence equalized.

DESCRIPTION OF THE PREFERRED EMBODIMENTS

Figure 1:
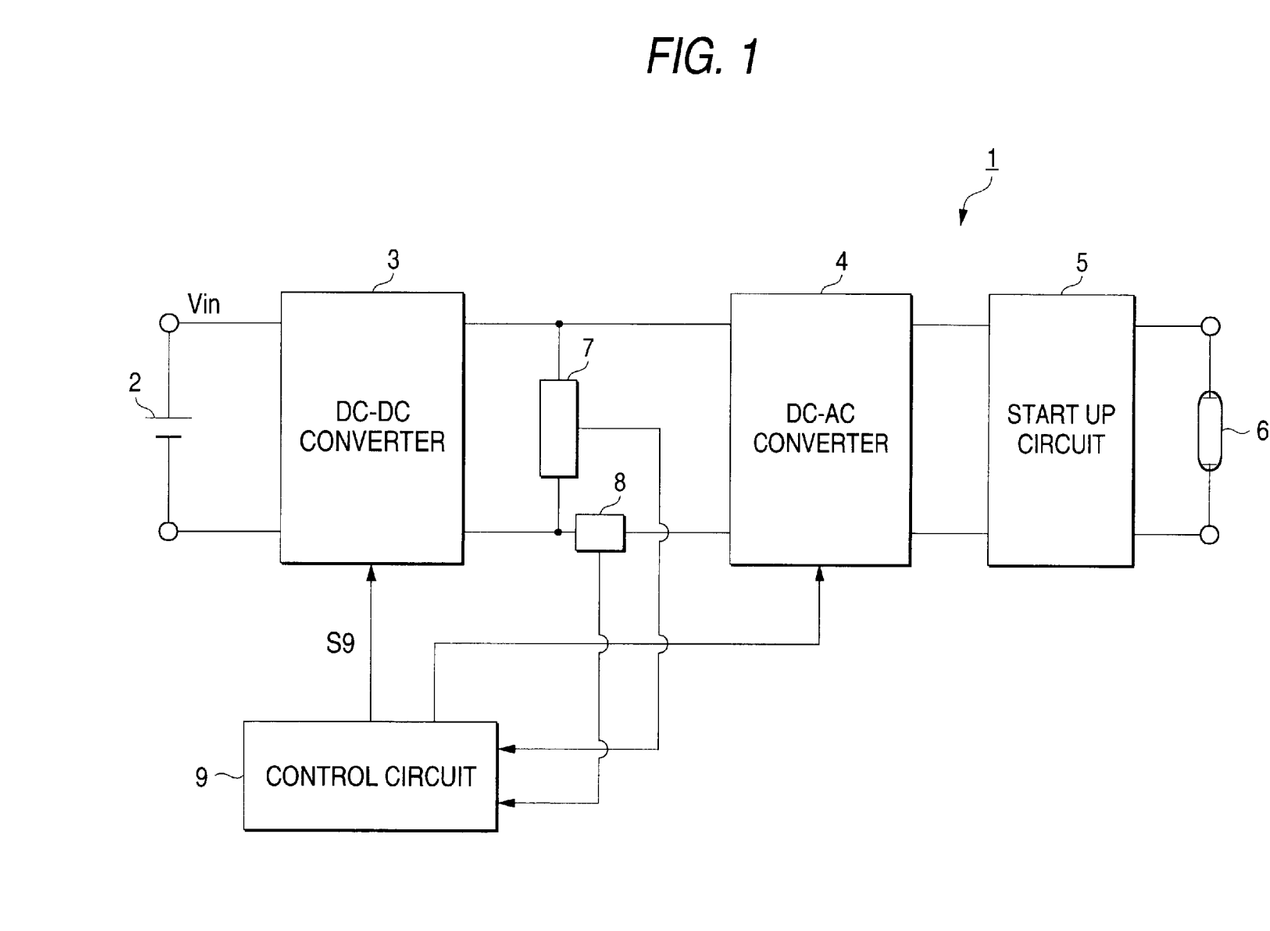
FIG. 1 is a block diagram showing a basic arrangement of a discharge lamp lighting circuit constructed according to the present invention.

The preferred embodiments of the present invention will be described with reference to the accompanying drawings. In FIG. 1 showing a basic circuit arrangement constructed according to the present invention, a discharge lamp lighting circuit 1 includes a DC power source 2, a DC-DC converting circuit 3, a DC-AC converting circuit 4, and a start-up circuit 5. A typical application of the discharge lamp lighting circuit 1 is a vehicular discharge lamp, such as a metal halide lamp. It should be understood that the invention has various other applications.

The DC-DC converting circuit 3 receives a DC input voltage (denoted as "Vin") from the DC power source 2, increases the voltage to a desired voltage, and outputs it. Its output voltage is variably controlled in accordance with a control signal derived from a control circuit to be described later. A DC-DC convertor (flyback type or the like) having a construction of the switching regulator may be used for the DC-DC converting circuit 3.

The DC-AC converting circuit 4 is provided at a post stage of the DC-DC converting circuit 3, and converts the output voltage of the DC-DC converting circuit into an AC voltage and applies the converted one to the discharge lamp 6. For example, a combination of a bridge circuit (full or half bridge circuit) constructed by using a plurality of semiconductor switching elements and its drive circuit or the like may be used for the DC-AC converting circuit. Any other suitable circuit arrangement may be used, as a matter of course.

The start-up circuit 5 is provided for causing the discharge lamp 6 to generate a high voltage signal (a pulse for starting up or a start-up pulse) to start up the discharge lamp 6. The high voltage is superimposed on an AC voltage output from the DC-AC converting circuit 4 and then applied to the discharge lamp 6.

A detecting circuit for detecting a voltage or current applied or fed to the discharge lamp 6 may be realized in the following ways:

In order to directly detect a bulb voltage or current of the discharge lamp, a current detecting element (shunt resistor, detecting transformer or the like) is connected to the discharge lamp, to thereby detect current flowing through the element, To detect a voltage that corresponds to the bulb voltage or current of the discharge lamp.

In the case of FIG. 1, a voltage detect device 7 (e.g., a circuit for detecting an output voltage by using voltage dividing resistors or the like) and a current detect device 8 (detecting resistive element or the like) are provided immediately after the DC-DC converting circuit 3. With those devices, a signal (substitute signal) corresponding to voltage or current applied to the discharge lamp 6 is used for the detection, and is transferred to a control circuit 9.

The control circuit 9 receives a detect signal of voltage or current of the discharge lamp to perform the lighting control according to a state of the discharge lamp 6, and controls the power supplied to the discharge lamp. Specifically, it controls the switching elements forming the DC-DC converting circuit and those forming the DC-AC converting circuit.

Figure 2:
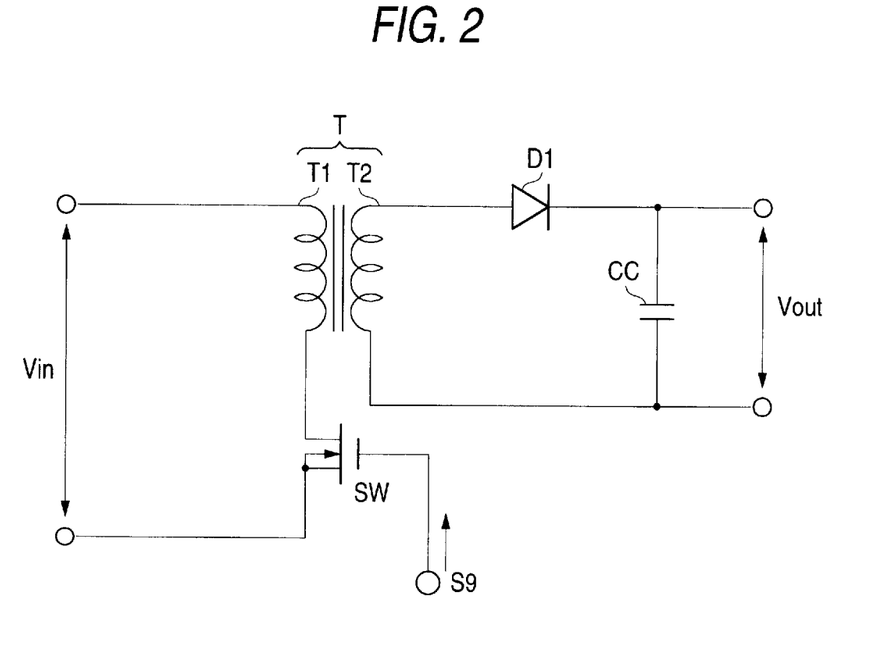
FIG. 2 is a circuit diagram showing a DC-DC converting circuit.

FIG. 2 is presented for explaining a circuit arrangement of the DC-DC converting circuit, and in the present invention, that circuit contains a transformer and a switching element for output control.

In this instance, a switching element SW (N channel FET) is connected to the primary winding T1 of a transformer T. The secondary side (secondary winding T2) of the transformer T is coupled to a first rectifying element D1 and a capacitor CC. A voltage across the capacitor is taken out as an output voltage "Vout".

A control signal (denoted as "S9") is applied from the control circuit 9 to the switching element SW, so that the switching element is controlled (viz., a control voltage is applied to the gate of the FET to be turned on or off), and the output voltage Vout is variably controlled. Specifically, the first rectifying element D1 (diode in this instance) and the smoothing capacitor CC are provided at the output stage of the transformer T. Under on/off control of the switching element SW, energy stored in the transformer T is stored into the smoothing capacitor CC via the first rectifying element D1.

Figure 3:
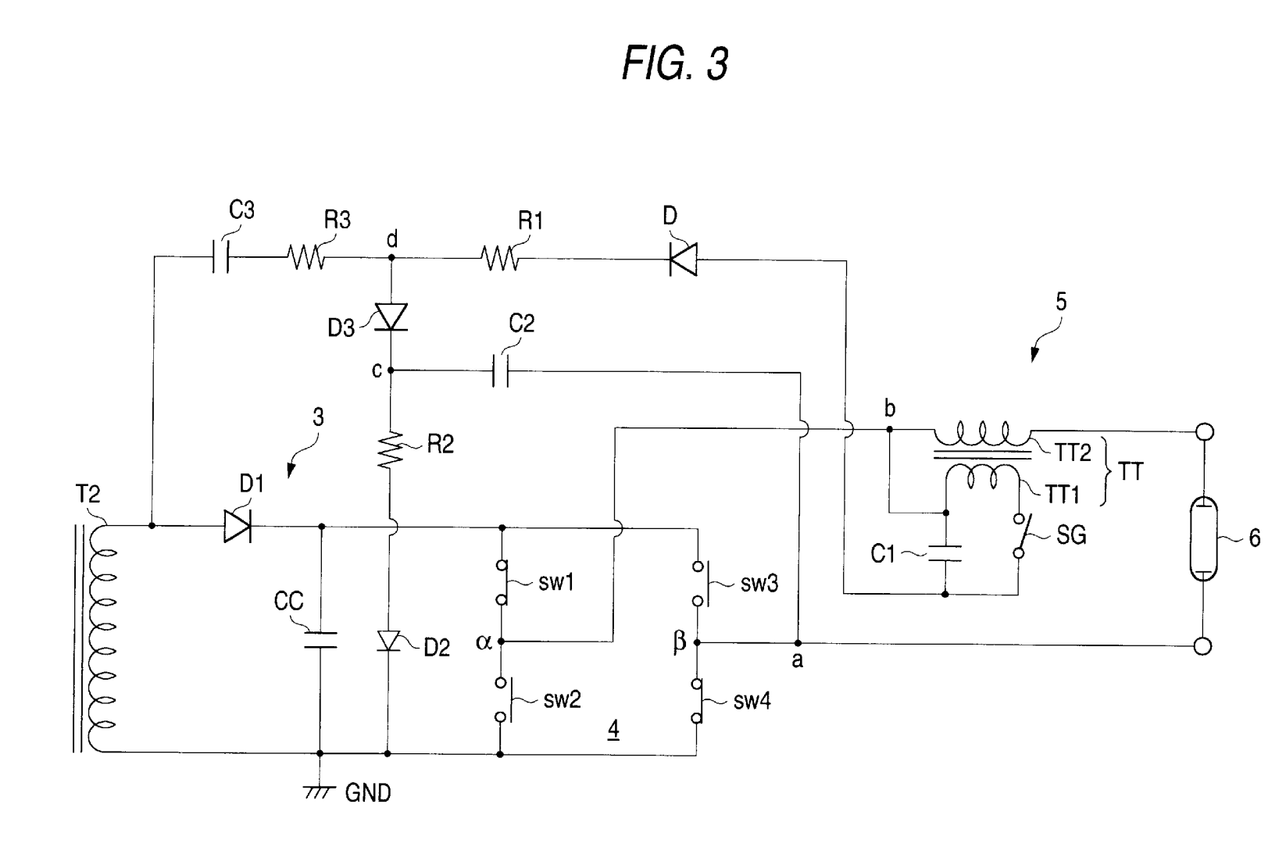
FIG. 3 is a circuit diagram showing a circuit arrangement of a key portion of the invention.

FIG. 3 is a circuit diagram showing a circuit arrangement of a key portion of the invention, and specifically it shows a circuit arrangement subsequent to the output stage of the transformer T forming the DC-DC converting circuit 3 (subsequent to the secondary winding T2). While in this instance, the diode is used for the rectifying element, a transistor (operated to be equivalent to a diode) or any other element having an equivalent function may be used in place of the diode, as a matter of course.

The DC-AC converting circuit 4 has a full bridge circuit arrangement using a plurality of switching elements sw1 to sw4. Through an alternating operation under the on/off control of the switching elements, an output signal of the DC-AC converting circuit 4 is output as an alternate current varying a fixed or variable frequency. In the figure, the switching elements sw1 to sw4 are represented by simple switch symbols (field effect transistors or the like are used actually). In operation, the switching elements sw1 and sw4 are paired and the switching elements sw2 and sw3 are paired, and those pairs are alternatively turned on and off by a drive signal from the control circuit, not shown.

The start-up circuit 5 provided at the post stage of the DC-AC converting circuit 4 includes a transformer TT. A primary side circuit of the primary winding TT1 of the transformer includes a first capacitor C1 and a switch element SG (illustrated as a simple switching symbol in the figure, but a spark gap element or the like is used actually), which are connected to the primary winding. One end of the first capacitor C1 is connected to one ends of the primary winding TT1 and the secondary winding TT2 of the transformer TT (corresponding to a connection terminal of both the windings, and it is connected to a node "□" between the switching elements sw1 and sw2 of the DC-AC converting circuit: it is denoted as "b" in the figure). The other end of the first capacitor C1 is connected to the other end of the primary winding TT1 of the transformer by way of the switch element SG. When the supply voltage to the switch element SG exceeds a threshold value (e.g., 800V), and the switch element is rendered conductive, charge stored in the first capacitor C1 is discharged, and a high voltage pulse generated across the secondary winding TT2 of the transformer TT is superimposed on the output signal of the DC-AC converting circuit 4, and the superimposed one is applied to the discharge lamp 6.

In the embodiment, the second capacitor C2 and the second rectifying element D2 as a rectifying element are connected in series between one of the output terminals of the DC-AC converting circuit (a node "β" between the switching elements sw3 and sw4: it is denoted as "a" in the figure), and a ground line. The second capacitor C2 is connected at one end to the node or connection point "a" and at the other end to the ground line (GND) by way of a resistor R2 and the second rectifying element D2. The second rectifying element D2 is connected such that it is forwardly directed to the ground line, and current flowing in the direction as defined by the diode charges the second capacitor C2. In this instance, the potential is set up with respective to the ground line, but it may be set up with a line corresponding to the ground line. This implies that a line on which a voltage used as a reference voltage when the capacitor is charged and discharged, is near a ground level, may be used as the reference line. For example, when a resistive element (shunt resistor) to detect current flowing through the discharge lamp is connected to the discharge lamp inserted between the output terminal of the DC-AC converting circuit and ground, a line connected to one end (not grounded) of the resistive element may be used as the reference line.

A third capacitor C3 and a third diode D3 are connected in series between a node between the secondary winding T2 of the transformer T and the first diode D1 (rectifying element), which form a DC-DC converting circuit 3, and a node on a line connecting the second capacitor C2 and the second diode D2 (=a node between the resistor R2 and the second capacitor C2: it is denoted as "c" in the figure). The third capacitor C3 is connected at one end to the node between the secondary winding T2 and the first diode D1, and at the other end to the anode of the third diode D3 by way of the resistor R3. The cathode of the third diode D3 is connected to the connection point "c". Accordingly, the third capacitor C3 is charged with current flowing in the direction as defined by the third diode D3 (rectifying element).

A node on a line connecting the third capacitor C3 and the third diode D3 (=a node between the resistor R3 and the third diode D3: it is denoted as "d" in the figure) is connected to the first capacitor C1 of the start-up circuit 5 by way of a voltage supplying line including the resistor R1 and a diode D. With this arrangement, the first capacitor C1 is charged. The diode D is connected at the anode to a node between the first capacitor C1 and the switch element SG, and at the cathode to the connection point "d" by way of the resistor R1.

In the circuit, when a potential at the point "a" is 350V and a potential at the point "b" is 0V, electric charge corresponding in amount to 350V is charged into the second capacitor C2 between the connection points "a" and "c". When the potential at the point "a" is 0V and the potential at the point "b" is 350V, a potential at the point "c" is "–350V", and switching current flows from the transformer T of the DC-DC converting circuit 3 to the point "c" by way of the third capacitor C3. As a result, an electric charge corresponding in amount to 700V is charged into the third capacitor C3. At this time, a potential at the point "d" is "–700V", and a difference of potentials between the point "d" and the point "b" (350V) is 1050V. Accordingly, a maximum of 1050V can be supplied to the first capacitor C1 of the start-up circuit 5, and the circuit is able to supply a sufficient amount of current to the switch element SG that is operable at 800V.

In the instance, three resistors R1, R2 and R3 are inserted in the circuit. If the currents flowing through the diodes and the capacitors are smaller in value than the rated values, there is no need for using those resistive elements. A case where the output voltage of the DC-DC converting circuit 3 is positive to ground is used by way of example; however, it may be negative to the latter instead, in the invention.

In this way, the discharge lamp lighting circuit is able to produce the voltage necessary for storing charge in the first capacitor C1 of the start-up circuit 5 by the utilization of the switching operations in the DC-DC converting circuit and the DC-AC converting circuit.

To more satisfactorily cope with the problem on the time intervals at which start-up pulses are generated, the following measure may be taken:

1) to increase a load at the output stage of the DC-DC converting circuit,
2) to increase a load at the output stage of the DC-AC converting circuit,
3) to restrict the current flowing through the switch element of the DC-DC converting circuit, and to decrease a current restricting value when the output voltage of the DC-DC converting circuit increases to be in excess of a predetermined voltage.

The term "to increase a load" means that a load current is increased at output stage (viz., as the load current increases, the load increases.).

Figure 4:
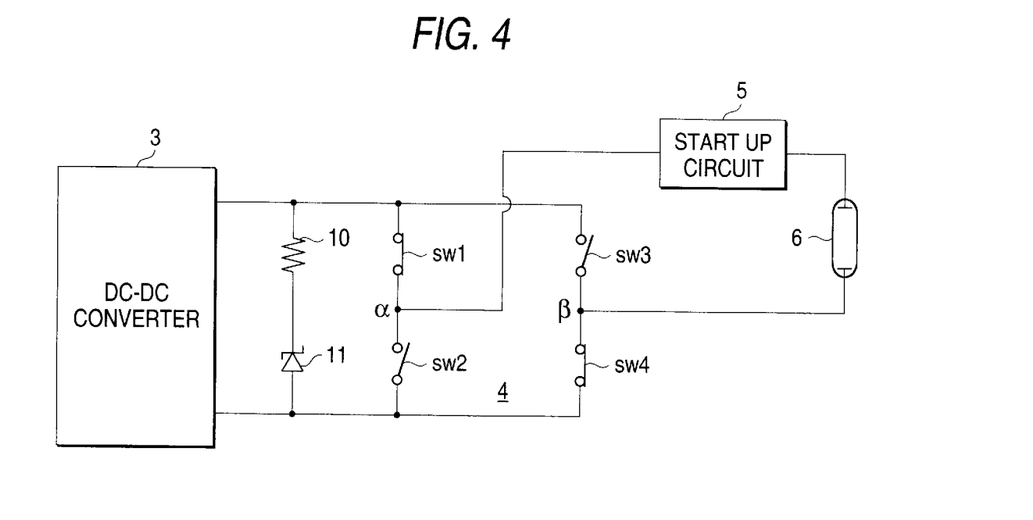
FIG. 4 is a circuit diagram showing a circuit arrangement in which a load is connected to the output stage of the DC-DC converting circuit.

FIG. 4 shows a circuit arrangement showing the measure 1) mentioned above. As shown, a series circuit of a resistor 10 and a Zener diode 11 is provided at the output stage of the DC-DC converting circuit 3.

Specifically, the resistor 10 is connected at one end to one of the output terminals of the DC-DC converting circuit 3, and at the other end to the cathode of the Zener diode 11. The anode of the Zener diode is connected to the other terminal of the DC-DC converting circuit 3. In the figure, in the DC-AC converting circuit 4, the four switching elements sw1 to sw4 are simply illustrated by switch symbols.

In this instance, when the output voltage of the DC-DC converting circuit 3 exceeds a Zener voltage, the Zener diode 11 is rendered conductive, and current starts to flow therethrough by way of the resistor 10, and hence, the electrical load is heavy. As a result, the reduction of the switching frequency of the DC-DC converting circuit is lessened.

Figure 5:
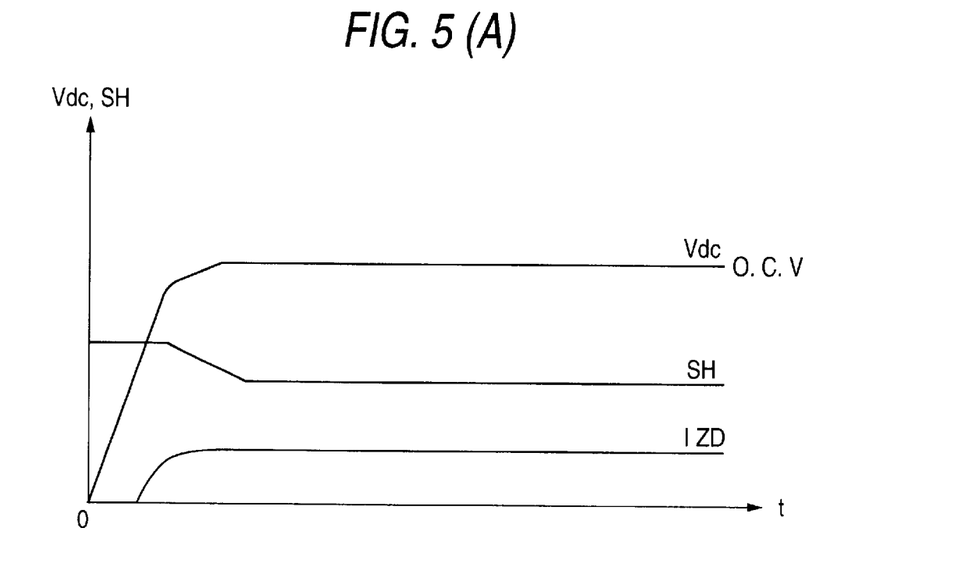
FIGS. 5(A) and 5(B) show the graphs for explaining an operation of the FIG. 4 circuit.

FIG. 5 graphically depicts the operation of the circuit under discussion as in FIG. 17 (in FIG. 5, the same reference characters as those in FIG. 17 are used, except "ZD" means a Zener current flowing through the Zener diode.).

When the output voltage Vdc rises and the Zener current IZD starts to flow, the load is increased or becomes heavy. Accordingly, a decreasing rate of the switching frequency SH is smaller than that in the FIG. 17 case. Therefore, the problem that much time is taken for the second and subsequent operations of charging the first capacitor C1 when comparing with the first charging operation is solved, and hence start-up pulses are generated at substantially fixed time intervals.

The reason why the Zener diode 11 is used is that when the discharge lamp is lighting, needless current flow must be avoided (such a current flow will cause the loss and heat generation). Fort the setting of the Zener voltage, for example, when the supply voltage is about 85V in a state that the discharge lamp is lighting, a preferable Zener voltage is higher than it, one hundred and several tens V or higher.

FIGS. 6 to 9 show exemplar circuit arrangements of the measure of 2) above. In the circuit arrangements of FIGS. 6 and 7, a series circuit of a resistor and a Zener diode is provided at the output stage of the DC-DC converting circuit. In the circuit arrangements of FIGS. 8 and 9, a resistor is provided at the output stage of the DC-AC converting circuit.

In the case of using the series circuit of the resistor and the Zener diode, the circuit is provided between the output terminals of the DC-DC converting circuit and the output terminals of the DC-AC converting circuit, or between the output terminals of the DC-AC converting circuit and ground or a line which is equivalent to ground.

Figure 6:
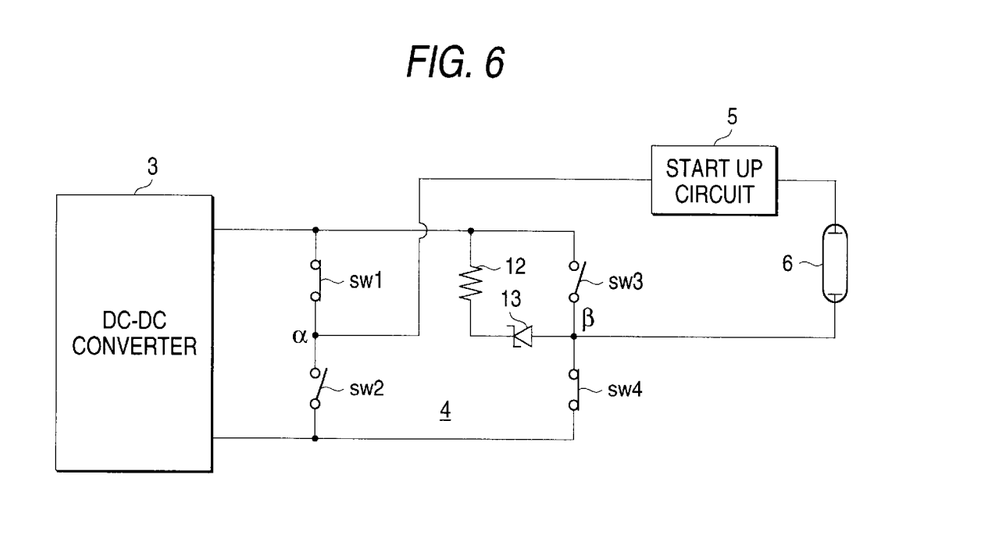
FIG. 6 is a circuit diagram showing a circuit arrangement in which a load is connected to the output stage of the DC-AC converting circuit, and a resistor and a Zener diode are used.

In the circuit arrangement shown in FIG. 6, a resistor 12 is connected at one end to one of output terminals of the DC-DC converting circuit 3, and at the other end to the cathode of a Zener diode 13. The anode of the Zener diode 13 is connected to one of the output terminals of the DC-AC converting circuit 4 (=node "β" between the switching elements sw3 and sw4).

Figure 7:
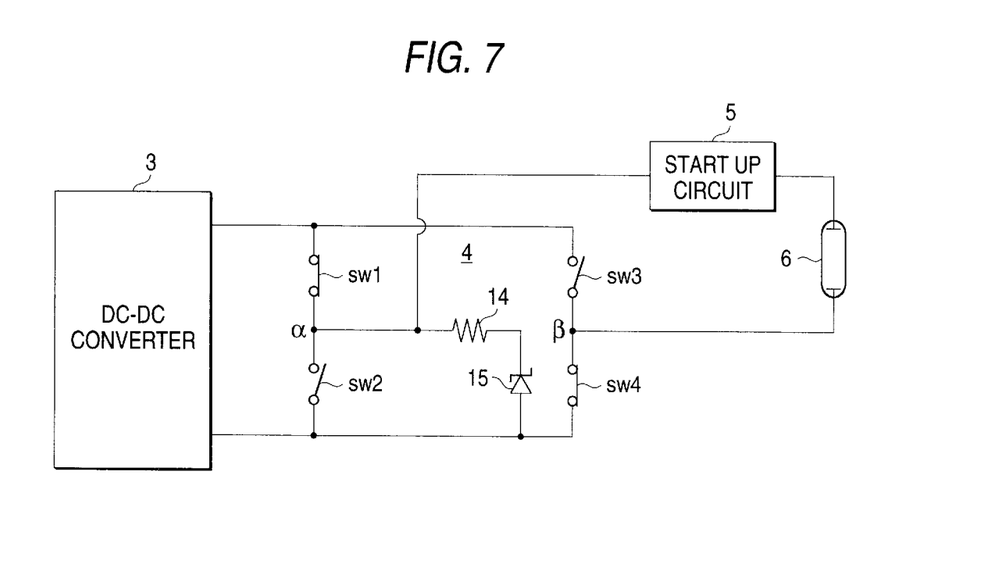
FIG. 7 is a circuit diagram showing a circuit arrangement which is different from that of FIG. 6.

In the circuit arrangement shown in FIG. 7, a resistor 14 is connected at one end to one of output terminals of the DC-AC converting circuit 4 (=node "α" between the switching elements sw1 and sw2), and at the other end to the cathode of a Zener diode 15. The anode of the Zener diode is connected to one of the output terminals of the DC-DC converting circuit 3.

In the arrangement shown in those figures, one end of the resistor is connected to one of output terminals of the DC-DC converting circuit or the DC-AC converting circuit. When one end of the resistor is connected to the DC-DC converting circuit, the other end of the resistor is connected to one of the connecting terminals of the DC-AC converting circuit by way of the Zener diode. When one end of the resistor is connected to the DC-AC converting circuit, the other end of the resistor is connected to one of the connecting terminals of the DC-DC converting circuit by way of the above-mentioned Zener diode.

Figure 8:
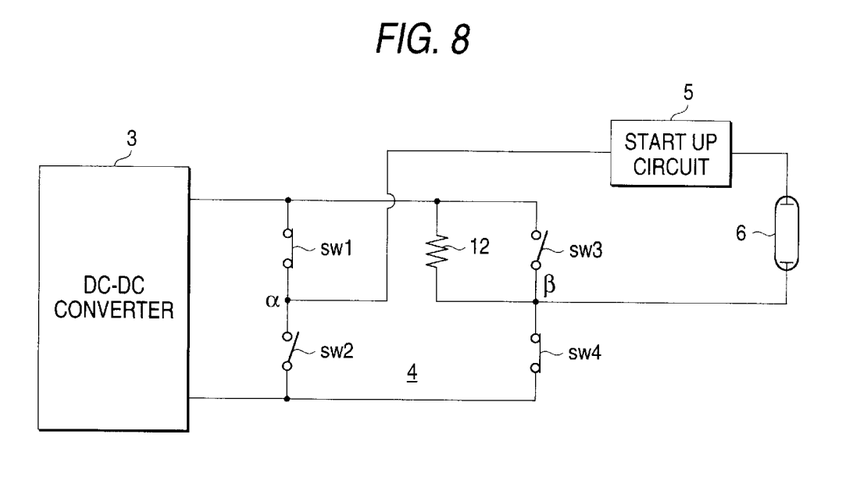
FIG. 8 is a circuit diagram showing another circuit arrangement in which a load is connected to the output stage of the DC-AC converting circuit, and only a resistor is used.

The circuit arrangement shown in FIG. 8 corresponds to the FIG. 6 circuit arrangement from which the Zener diode 13 is removed. In the circuit arrangement, one end of the resistor 12 is connected to one of the output terminals of the DC-DC converting circuit 3, and the other end of the resistor is connected to the point "β".

Figure 9:
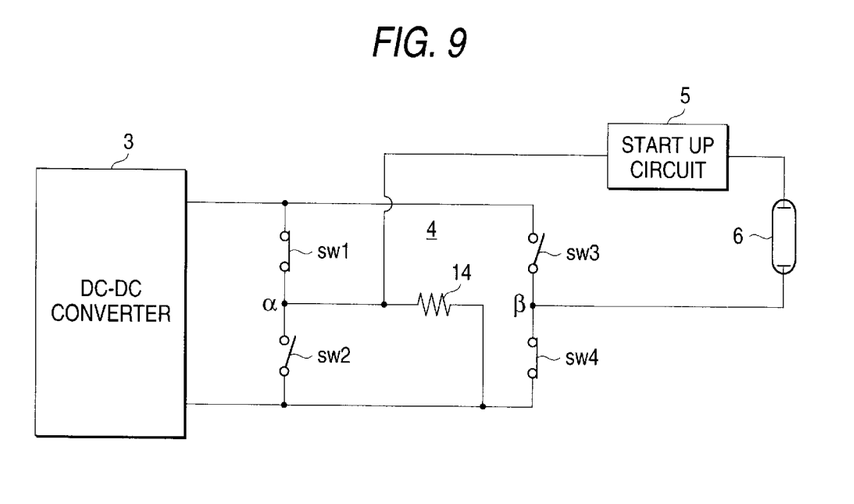
FIG. 9 is a circuit diagram showing a circuit arrangement which is different from that of FIG. 8.

The circuit arrangement shown in FIG. 9 corresponds to the FIG. 7 circuit arrangement from which the Zener diode 15 is removed. One end of the resistor 14 is connected to one of the output terminals of the DC-DC converting circuit 3, and the other end of the resistor is connected to the point "α".

In the circuit arrangements of FIGS. 6 and 7, a Zener current flowing path is located at the output stage of the DC-AC converting circuit. Those circuit arrangements also produce useful effects comparable with those by the FIG. 4 circuit arrangement.

Figure 10:
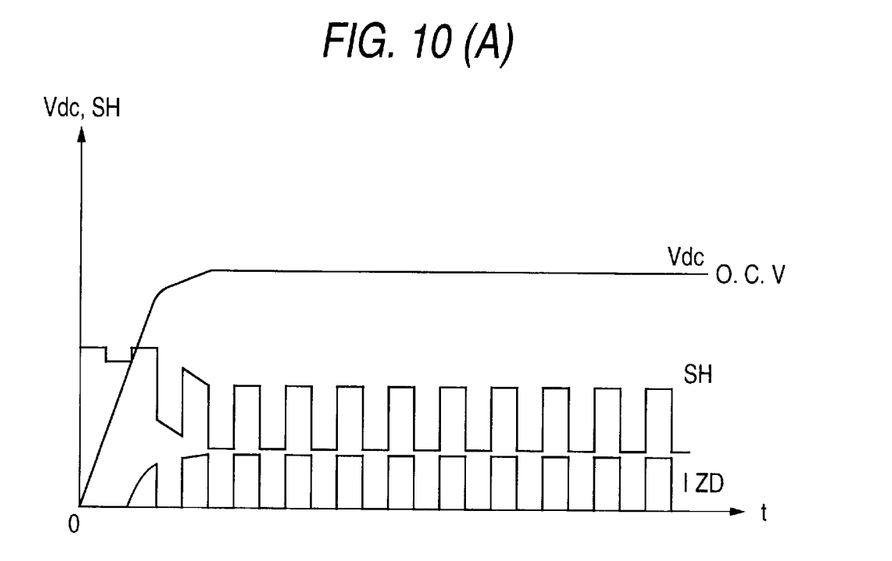
FIGS. 10(A) and 10(B) show the graphs for explaining an operation of the FIGS. 6 and 7 circuit arrangements.

FIG. 10 diagrammatically shows the operation of the circuit arrangements (symbols used are the same as those used in FIG. 5).

A DC input is converted into an output having a rectangular waveform through the alternating operation by the control of the switching elements in the DC-AC converting circuit 4. Accordingly, an AC (rectangular wave) component appears in the Zener current IZD and the switching frequency SH. When observing the envelopes of the waveforms of the IZD and SH (or observing only the conduction period of the Zener diode), the same thing as in the case of the FIG. 5 graph holds.

Specifically, the output voltage "Vdc" rises, the Zener current IZD starts to flow, and the electrical load increases or is heavy during the conduction period of the Zener diode. Accordingly, a decreasing rate of the switching frequency SH is smaller than that in the FIG. 17 case, during the conduction period. Therefore, the problem that much time is taken for the second and subsequent operations of charging the first capacitor C1 when comparing with the first charging operation is solved, and hence start-up pulses are generated at substantially fixed time intervals.

A timing which allows an easy supply of the output of the DC-AC converting circuit 4 to the first capacitor C1 and a timing which allows a hard supply of the same are generated depending on the polarity of the output of the DC-AC converting circuit 4. Accordingly, the timing of generating the start-up pulse is determined by the polarity of the output of the DC-AC converting circuit. In other words, a timing at which the start-up pulse (=pulse generating timing during a period that the first capacitor C1 is charged and its terminal voltage increases) is easy to be generated and a timing at which it is hard to be generated (during a period that the terminal voltage of the first capacitor C1 a little varies) may be generated. Whether or not the current feeding is allowed after the breaking down of the discharge lamp is determined by the output polarity. Accordingly, what a designer has to do is to provide a resistor and a Zener diode for the polarity which the current feeding is smoothly performed.

In the FIGS. 8 and 9 arrangements, the resistor is used but the Zener diode is not used. Therefore, when the switching elements sw4 and sw2 are in an on state, current flows through the resistor. For this reason, it is desired that in setting a load condition, comparison is made between the effect produced when the resistor is used and the current flowing when the discharge lamp is lighting.

The measure of 3) above will be described.

In the embodiment, the electrical load is not applied to the DC-DC converting circuit and the DC-AC converting circuit 4. In the embodiment, a current value of the current flowing through the switching elements of the DC-DC converting circuit is monitored, and that current is restricted so that its current value is below a predetermined current value. When the output voltage of the DC-DC converting circuit increases to be in excess of the predetermined voltage value is lowered.

There are various current restricting methods. An exemplar of the current restricting method, which is based on the pulse-by-pulse system, will be described.

Figure 11:
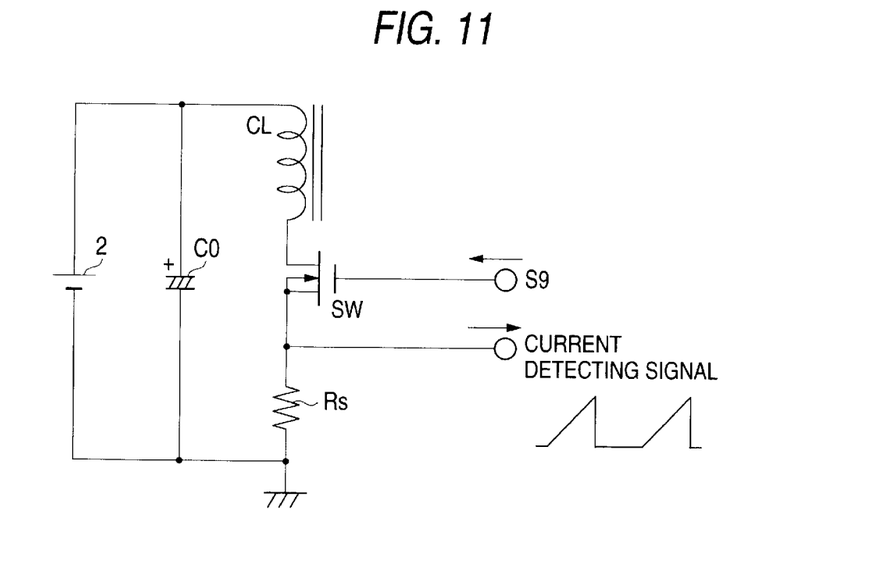
FIG. 11, together with FIG. 12, shows, in a circuit diagram, a current detect circuit based on the pulse-by-pulse system.
Figure 12:
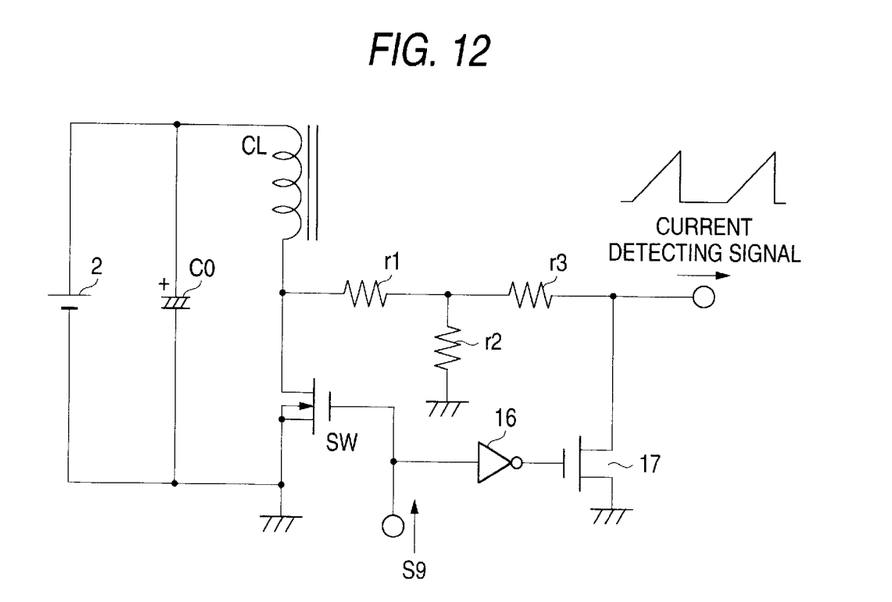
FIG. 12 is a circuit diagram showing another circuit arrangement of the current detect circuit, which is different from that of FIG. 11.

In FIGS. 11 and 12 showing current detecting circuit arrangements, FIG. 11 shows a current detecting circuit in which a detecting element is connected to a switching element, and FIG. 12 shows another current detecting circuit by utilizing an on-resistance of the switching element.

In FIG. 11, a capacitor C0 is connected across a DC power source 2. The capacitor C0 is connected in parallel with a series circuit including a coil CL (corresponding to the primary winding T1 of the transformer T) and an N channel FET "SW" (receives a control signal S9 from a control circuit 9).

The FET is connected in series to a shunt resistor Rs (the source of the FET is earthed through the shunt resistor). Accordingly, a current is detected from a voltage drop that is produced across the resistor when current flows through the resistor (See a saw-tooth pulse waveform in the figure.). In an actual circuit, a low-pass filter (e.g., a CR integrating circuit) is used in order to prevent the erroneous operation owing to high frequency noise generated at the time of switching.

The differences of the FIG. 12 circuit arrangement from that of FIG. 11 will be described hereunder.

The source of the FET is earthed.

For the detection of current flowing through the FET, resistors r1 to r3 are provided. One end of the resistor r1 is connected to the drain of the FET. The other end of the resistor r1 is earthed via the resistor r2. One end of the resistor r3 is connected to a node between the resistors r1 and r2, and a current detecting signal (See a saw-tooth pulse waveform in the figure.) is obtained through the resistor.

An input terminal of a NOT gate 16 is connected to the gate of FET. An analog switch element 17 (represented by a simple symbol in the figure) is provided which is turned on and off by an output signal of the NOT gate. When the analog switch element 17 is turned on, one end of the resistor r3 (opposite to the terminal connected to the resistor r2) is earthed.

In the circuit arrangement, it is detected in the form of a voltage value as the product of multiplying an on-resistance (denoted as "RON") of the FET, a current value, and a voltage dividing ratio (dividing ratio by the resistors r1 and r2).

The analog switch element 17 is provided for neglecting a large voltage generated when the FET is turned off, and is turned on when the FET is turned off.

When a current detecting signal thus obtained is received and a value of the signal reaches a predetermined value, the switching element SW (=FET in the above instance), whereby the current is restricted.

In other words, what a designer has to do is to provide a current restricting component which restricts the current of the switching element to be below a predetermined current value. A circuit arrangement to implement this is shown in FIGS. 13 to 16. The circuit arrangement utilizes a pulse-by-pulse current detecting signal as it is or a signal (denoted as "SI") formed by processing it for a saw-tooth wave signal used by the PWM (pulse width modulation) or PFM (pulse frequency modulation), and generates a control signal for transfer to the switching element SW. To use the PWM control or the like for the lighting control of the discharge lamp and the power control is well known. A signal as produced by computing a detect signal on the voltage or current of the discharge lamp (generation of the signal is not essential to the invention, and hence no further description of it will be given here) is input to an error amplifier (not shown), and a difference signal between it and a reference signal is output as an error signal (denoted as "ES"). A control signal whose duty cycle is determined through the level comparison of the signal "ES" with a predetermined saw-tooth wave signal, is generated, and the switching element SW (of the DC-DC converting circuit) is controlled in accordance with the control signal.

Figure 13:
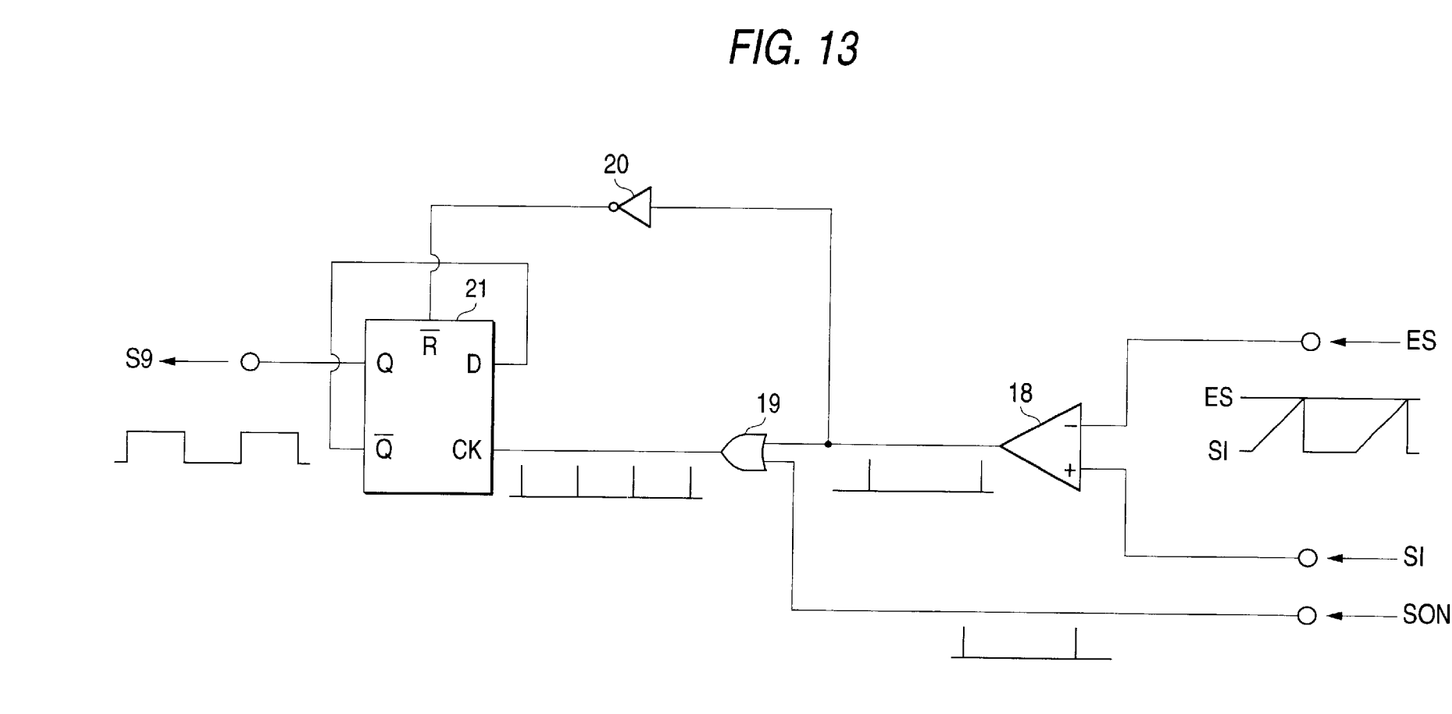
FIG. 13 is a circuit diagram showing a key portion of a circuit arrangement for controlling a switching element in a DC-DC converting circuit by the current detection based on the pulse-by-pulse system.

In FIG. 13, an signal "ES" is input to the negative input terminal of a comparator 18, and a current detecting signal SI is input to the positive input terminal of the comparator. An output signal of the comparator 18 is input to one of the input terminals of a two-input OR gate, and is sent to the reset terminal (indicated by a bar attached to the top of "R") as an L active input of a D-flip flop 21 by way of a NOT gate 20.

A signal "SON" is applied to the remaining input terminal of the OR gate 19. This signal is an instruction signal for causing a pulse at the timing at which the switching element SW is turned on. In the PWM control, it is generated while having a predetermined frequency, and in the PFW control, it is generated after a fixed time elapses since the off-time.

An output signal of the OR gate 19 is input to a clock signal input terminal (CK of a D-flip flop 21. A D input terminal of the flip-flop is connected to a Q bar output terminal (indicated by a bar attached to the top of "Q"). Accordingly, it serves as a 1-bit counter (or a T-flip-flop). The Q output signal of the D-flip flop 21 is used as an on/off control signal "S9" to be transferred to the switching element SW or a signal from which the signal "S9" is generated.

In this circuit, when a voltage level of a current detecting signal S1 reaches a level of the error signal "ES" (=output signal of the error amplifier), the comparator 18 produces an H (high) level signal. A signal as a logical sum of this signal and the signal "SON" is output from the OR gate 19 to the D-flip flop 21, and with its latch output signal, a control signal to the switching element SW is generated.

Accordingly, if the voltage of the error signal "ES" is clamped to be below a predetermined voltage, the current control mentioned above can be realized, as will readily be understood. For example, the FIG. 14 circuit arrangement 22 may be used for this.

Figure 14:
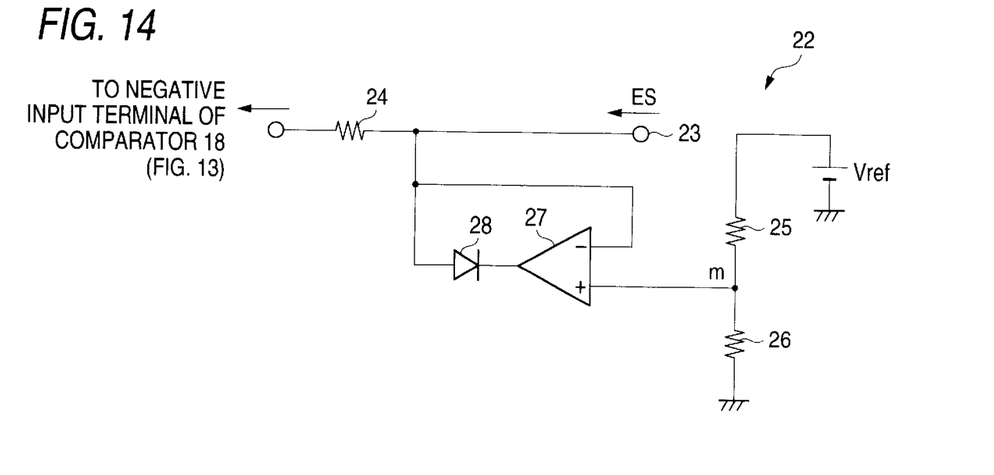
FIG. 14 is a circuit diagram showing a clamp circuit.

A supply terminal 23 of the error signal "ES" is connected to the negative input terminal of the comparator 18 by way of a line 24 having a resistor. A reference voltage "VREF" (indicated by a constant voltage source symbol in the figure) is divided by resistors 25 and 26, and the resultant is applied to the non-inverting input terminal of an operational amplifier 27. The output terminal of the operational amplifier 27 is connected to the line 24 and also to the inverting input terminal thereof, through a diode 28 whose anode is connected to the output terminal of the operational amplifier (the diode is disposed while being directed in the forward direction to the operational amplifier 27).

Assuming that the clamp voltage formed by dividing the reference voltage "VREF" by using the resistors is "VCLP", and a resistance value of the shunt resistor used in the FIG. 11 circuit is "Rs", then a current restricting value by the pulse-by-pulse mode may be defined as "VCLP/Rs" if the current detecting signal SI is not processed.

To lower the predetermined current value (or restricting current value) when the output voltage of the DC-DC converting circuit increases to be above the predetermined voltage value, a measure that one may take is to detect the output voltage and to vary the VCLP value (to lower the VCLP value) since the Rs value is constant. This may be implemented by the circuit arrangement of FIG. 15 or 16.

Figure 15:
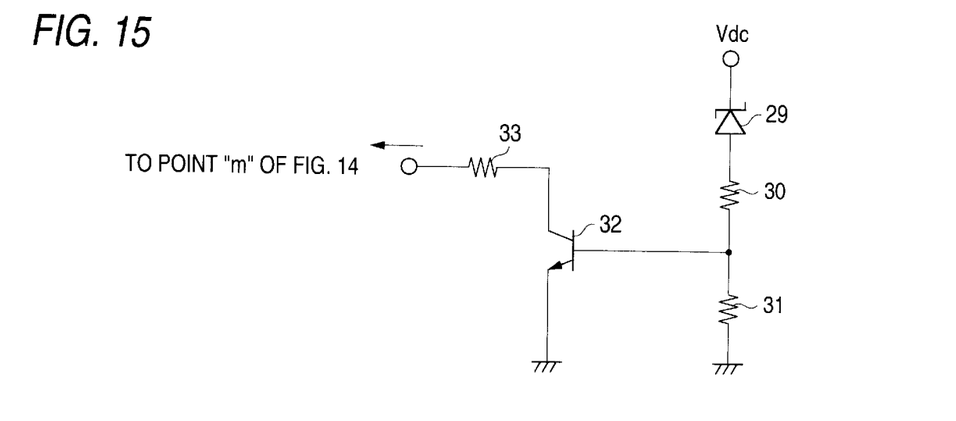
FIG. 15 is a circuit diagram showing a circuit arrangement for detecting an output voltage of the DC-DC converting circuit and for controlling a clamp voltage.

In the case of FIG. 15, a series connection of a Zener diode 29, and voltage dividing resistors 30 and 31 is provided for the output voltage "Vdc" of the DC-DC converting circuit 3. In the circuit, a detecting voltage by the voltage dividing resistors is applied to the base of a NPN transistor 32. The collector of the transistor 32 is connected to a node (indicated by a point "m" in the figure) between the resistors 25 and 26 in FIG. 14 through a resistor 33, and the emitter of the NPN transistor is earthed.

When the output voltage "Vdc" increases to be in excess of a lighting voltage (corresponding to the Zener voltage), the NPN transistor 32 lowers the clamp voltage VCLP. The lighting voltage is selected to be higher than a supply voltage generated when the discharge lamp is actually lighting (The reason for this is that at least in the lighting condition, the circuit is put in a state that it is able to supply a maximum of electric power.).

Figure 16:
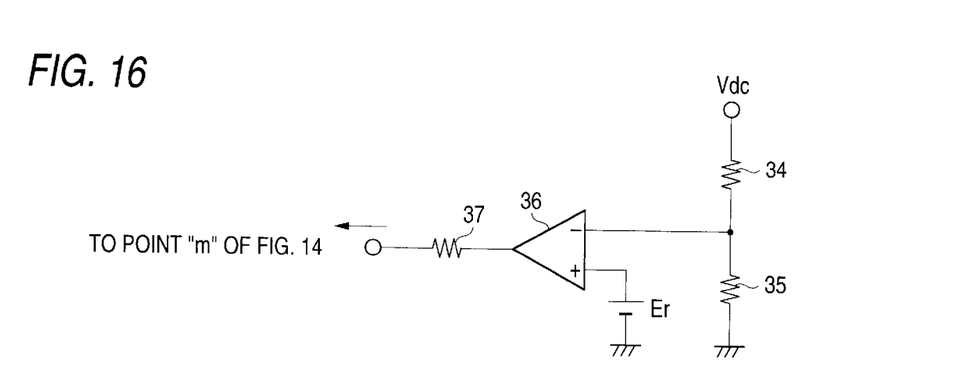
FIG. 16 is a circuit diagram showing another circuit arrangement for the same purpose as of the FIG. 15 circuit.

In the case of FIG. 16, the output voltage "Vdc" of the DC-DC converting circuit 3 is detected by use of the voltage dividing resistors 34 and 35. The detecting voltage is applied to the negative input terminal of the comparator 36 of the open collector output type. The output signal as produced through the comparison of it with a reference voltage "Er" applied to the positive input terminal of the comparator, is output through a resistor 37. One end of the resistor 37 is connected to the node "m" between the resistors 25 and 26 in FIG. 14. Therefore, when the output voltage "Vdc" increases to be more than a predetermined lighting voltage (corresponding to the reference voltage "Er"), the comparator 36 lowers the clamp voltage VCLP.

The lowering of the clamp voltage VCLP means that the pulse-by-pulse mode restricting current decreases (viz., the current restriction is intensified.). Accordingly, the energy that can be output through one switching operation of the switching element SW before the discharge lamp is turned on is small. Accordingly, the increase of the output voltage "Vdc" to the open circuit voltage (OCV) is suppressed, and the switching frequency SH is high, so that the voltage supply to the first capacitor C1 of the start-up circuit 5 is averaged, and the timer intervals of the start-up pulse generation is equalized.

Before the discharge lamp is lit (before its break-down), no current flows into the discharge lamp. In this state, the DC-DC converting circuit will exhibit its full control (maximum control). When the supply voltage becomes below the voltage (OCV) restricted by the control circuit 9, it performs its full control, so that the supply voltage is large. In turn, the circuit operation (switching operation) stops, and the supply voltage decreases, and then the maximum control is performed again. Where the interval of such an intermittent switching operation is long, the timing of supplying charge to the first capacitor C1 in the start-up circuit 5 is slow. To cope with this, the time interval of the switching operation is reduced by using the current restricting function mentioned above and the control for lowering the restricting current value in response to the output voltage value of the DC-DC converting circuit and in accordance with the increase of the detected output voltage, whereby the switching frequency (SH) is increased. As seen from the foregoing description, the first discharge lamp lighting circuit charges the second and third capacitors by the utilization of the switching controls of the DC-DC converting circuit and the DC-AC converting circuit, whereby the supply voltage necessary for charging the first capacitor in the start-up circuit is obtained. The number of parts used is relatively small, and use of a capacitor of small capacitance is allowed. The feature is favorable for the device size and cost reduction. It is noted that the switching control of the DC-AC converting circuit as well as that of the DC-DC converting circuit is utilized. Therefore, the time intervals at which the start-up pulses are generated are substantially equal and hence equalized. The starting performance of the discharge lamp lighting circuit is superior to that of the circuit using only the switching control of the DC-DC converting circuit.

In the second to fourth discharge lamp lighting circuits, a charging rate of the charging to the first capacitor in the start-up circuit is increased by merely using a small number of elements (resistors and Zener diodes) in the output stages of the DC-DC converting circuit and the DC-AC converting circuit. The effects by the equalizing of the start-up pulse generation intervals can fully be educed, and this is advantageous in cost reduction.

In the fifth discharge lamp lighting circuit, a value of current through the switching element forming the DC-DC converting circuit is monitored and restricted. When the output voltage of the DC-DC converting circuit exceeds a predetermined voltage value, by intensifying the current restricting operation, the switching frequency of the switching element is increased, and hence the charging rate of the charging to the first capacitor in the start-up circuit is increased.

The foregoing description of an embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated.

What is claimed is:

1. A discharge lamp lighting circuit having a DC-DC converting circuit, a DC-AC converting circuit provided at a post stage of said DC-DC converting circuit, and a start-up circuit for generating a start-up pulse for application to a discharge lamp, wherein A) said start-up circuit includes a transformer, and at a primary side circuit with the primary winding of said transformer, a first capacitor and a switch element are provided, whereby in case of said switch element being conductive, a charge stored in said first capacitor is discharged, and a high voltage pulse generated in the secondary winding of said transformer is supplied as a start-up pulse to said discharge lamp;

B) said DC-DC converting circuit includes a transformer and a switch element for the output control, and a first rectifying element and a smoothing capacitor are provided at the output stage of said transformer, whereby an energy stored in said transformer is stored into said smoothing capacitor through said first rectifying element by an on/off control of said switching element;

C) said DC-AC converting circuit includes a bridge circuit using a plurality of switching elements, and the output signal of said DC-DC converting circuit is output, in the form of an alternate current varying at a fixed or variable frequency, through alternating operations of said switching elements by the on/off control;

D) a circuit including a second capacitor and a second rectifying element between one of the output terminals of said DC-AC converting circuit and a ground line or a line equivalent to it, and said second capacitor is charged with current flowing in the direction as defined by said second rectifying element connected to said line;

E) a circuit including a third capacitor and a third rectifying element is disposed between a node between the secondary winding of said transformer and said first rectifying element and a node on a line connecting said second capacitor and said second rectifying element, and said third capacitor is charged with current flowing in the direction as defined by said third rectifying element connected to a connection line connecting said second capacitor and said second rectifying element; and F) a node between said third capacitor and said third rectifying element is connected to a voltage supply line to said first capacitor to charge said capacitor.

2. The discharge lamp lighting circuit according to claim 1, wherein a series circuit including a resistor and a Zener diode is provided at the output stage of the DC-DC converting circuit.

3. The discharge lamp lighting circuit according to claim 1, wherein a circuit comprising a resistor and a Zener diode with being connected in series is provided between the output terminal of said DC-DC converting circuit and the output terminal of said DC-AC converting circuit or between the output terminal of said DC-AC converting circuit and ground or its equivalent line.

4. The discharge lamp lighting circuit according to claim 1, wherein a resistor is provided between the output terminal of said DC-DC converting circuit and the output terminal of said DC-AC converting circuit or between the output terminal of said DC-AC converting circuit and ground or its equivalent line.

5. The discharge lamp lighting circuit according to claim 1, further comprising a current restricting means which monitors a value of current through said switching element forming said DC-DC converting circuit, and restricts said current to be below a predetermined current value, and when the output voltage of said DC-DC converting circuit exceeds a predetermined voltage value, said predetermined current value is lowered.

* * * * *